Figure 1:
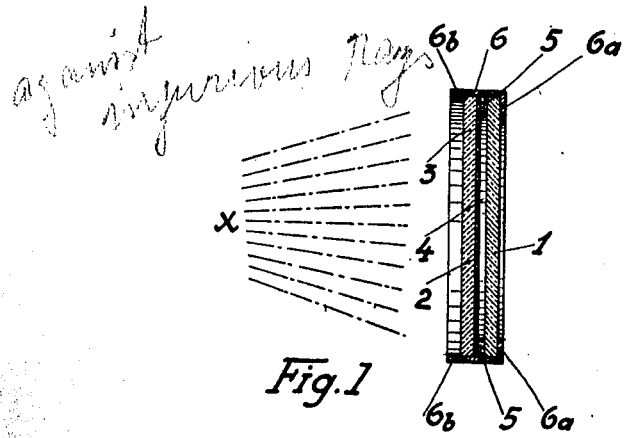

July 20, 1937. D. DE BAYER-KRUCSAY 2,087,802
LIGHT FILTER
Filed Feb. 15, 1934

INVENTOR
Dezsö de Bayer-Krucsay
BY Fay, Oberlin & Fay
ATTORNEYS

Patented July 20, 1937

2,087,802

UNITED STATES PATENT OFFICE 2,087,802

LIGHT FILTER

Dezsö de Bayer-Krucsay, Budapest, Hungary

Application February 15, 1934, Serial No. 711,390

5 Claims. (Cl. 88—54)

It is well known that only the light rays corresponding to the mid-spectrum are harmless for the human eye, whereas ultra-violet rays and infra-red or heat rays have an injurious effect on it. Therefore, it has already been proposed to eliminate these injurious rays by means of light filters or eye-glasses composed of glass plates in various colors. Furthermore, particularly for persons employed in glass blowing, metal foundry work, welding and similar operations it has already been proposed to make up transparent screens of a colored glass, for instance of yellow or green color, and another colorless glass having one side, the inner side, coated with a translucent or transparent metallic film, which latter, in order to be suitable for this purpose, will, of course, have to be made extremely thin. This metallic coating, deposited in various manners, for instance by cathodic sputtering, by electrolysis, by a chemical method or by burning in, has acted as a mirror reflecting the injurious infra-red or heat rays. The glasses themselves, consisting of glass plates, for instance of circular form, having a plano-parallel cross-section and inserted in a protecting mask or a mounting having the shape of eye-glasses, were joined by means of a transparent cement having an index of refraction similar to that of the glass, for instance by means of Canada balsam. One of the glasses has been not only the carrier of the metallic layer, but served also as a protecting external coating of the thin metallic film in order to protect the latter against wear due to external influences. Light filters of this kind are described in the specification of Letters Patent to Pfund No. 1,176,313. Furthermore, special eye-glasses have been proposed for use in the open air, which were composed of colorless glass lenses, cemented together by Canada balsam likewise, and enclosing a thin metallic film of various colors, made, for instance, of silver, platinum or gold, etc. for reflecting the injurious sunbeams.

The first mentioned light filters or protecting eye-glasses used in factories have the particular disadvantage that in using the same at a high temperature, the layer of Canada balsam between the two glass plates melts or becomes cracked, owing to sudden cooling, and therefore the glass plates got into a more or less loose condition and became dim and spotted; for instance, in glasses coated with silver the latter was oxidized by the gases often present in these factories and the coated glasses therefore lost their transparency as well as their reflecting power.

In order to avoid these drawbacks it is desirable to dispense with the transparent cementing layer between the two glasses, in which case the glasses would lie in a direct manner one superposed upon the other, but this also would be disadvantageous, because during the manufacture of the light filter the glasses placed in a direct manner, loosely, one upon the other, would be ground one by the other and the thin metallic film would be injured. The same drawback may present itself also in the finished light filter, if the glasses, not cemented together, were uneven owing to manufacture and would get into a loose condition on the frame of the light filter and might thus, likewise become marred one by the other.

All these disadvantages, i. e. the above mentioned drawbacks of the cementing layer (penetration of injurious gases, destroying the metallic film) as well as the marring of the metallic layer are eliminated according to the present invention by leaving an interstice between the glasses and closing the same along the periphery of the glass plates. For securing and closing the interstice or gap left between the glasses and preventing the mutual contact of the latter the light filter may be placed in a separate frame, preferably in a metallic frame and the glasses connected, to the inner wall of the frame, with a small gap being left between the glasses, such connection being effected, in any suitable manner, for instance, by means of cementing or gluing. Instead of such cementing, spacing members may be provided at some points along the periphery of the inner surfaces of the glasses facing each other. The light filter is then placed together with the metallic frame into the mask or other mounting having the shape of spectacles, which is intended for the reception of the light filter. As a suitable spacing member one complete annular piece around the periphery of the glasses may be inserted, if desired. Since this annular spacing member passes, as mentioned, around the whole periphery and therefore itself closes the gap between the glasses, a separate metallic frame may, in this case, be dispensed with and the glasses, together with the annular piece between them, may be placed direct into the eye-glass mounting or mask serving for the reception of the light filter. Nevertheless, a separate metallic clamping frame is to be preferred, since the latter, apart from its more efficient closing effect, renders possible an easier manipulation of the light filter during its manufacture and also an easier replacement of the light filter, when required. Of course, the most perfect construction is obtained by using a complete annular piece between the glasses as well as a separate metallic frame.

Most of the heat rays are reflected by the metallic film which latter is preferably provided at the inner side of the front glass exposed to the light, whereas a minor non-reflected part of the heat rays, heats the back glass and through the latter also the eyes to a certain amount. In order to prevent this undesirable effect the annular piece between the glasses is preferably made of a heat-insulating substance, paper for instance, affording, together with the interstice or air gap between the glasses, a certain amount of insulation against heat. Accordingly the annular piece has in this case a threefold effect, viz.: securing the distance between the glasses, closing the interstice and increasing the heat insulation.

Figure 3:
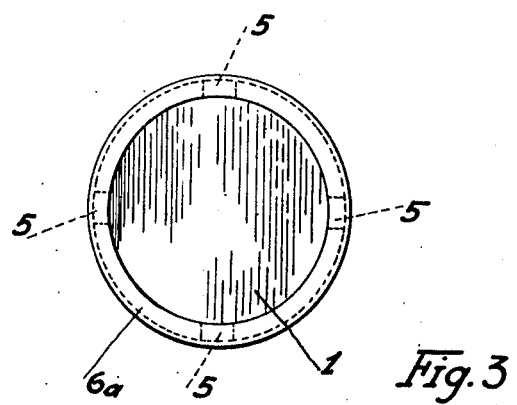

In the accompanying drawing:

Figs. 1, 2, 4 and 5 show some embodiment of my invention in diagrammatic cross-sections which, for the sake of clearness of illustration have been greatly exaggerated in the direction of the thickness. Fig. 3 shows one embodiment of my invention in back elevation.

Referring to the drawing by numerals, I have shown in Fig. 1 colored back glass 1 and uncolored front glass 3 which is the glass plate exposed to the light rays $x$ and carrying on its inner surface a thin metallic film 2. Between the parts 1 and 3, an interstice or air gap 4 is provided, which extends up to the periphery of the glasses. For securing a space between the glasses, as required for the maintenance of the air gap 4, an annular metallic frame 6 fitted with a flange 6a, is preferably provided. The peripheral parts of the glasses 1 and 3 are fastened to the inner wall of the frame 6 by any suitable manner, as, for instance, by means of cementing. Fig. 1 shows the assemblage of the light filter before its finish, the left side flange 6b of the frame 6 being not yet bent down. After the fastening of the glass plates 1 and 3 the flange 6b of the frame 6 is bent down towards the border of the glass plate 3 as shown in Fig. 2.

Figure 2:
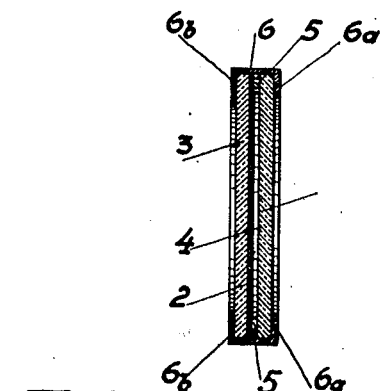

As indicated, above, instead of fastening the glasses 1 and 3 to the inner wall of the frame 6, spacing members 5 may be inserted between the glasses at some points along their periphery as shown in Figs. 1, 2 and 3.

Figure 4:
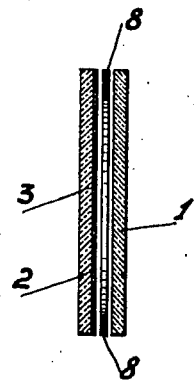

In the embodiment shown in Fig. 4 an annular piece 8 of paper is inserted between the parts 1 and 3 along the borders of the latter. This embodiment of the light filter may be placed into the eye-glass mounting serving for the reception of the light filter, this being done either by making use of a metal frame 6, or by dispensing with the latter, and placing the light filter direct into the eye-glass mounting.

Figure 5:
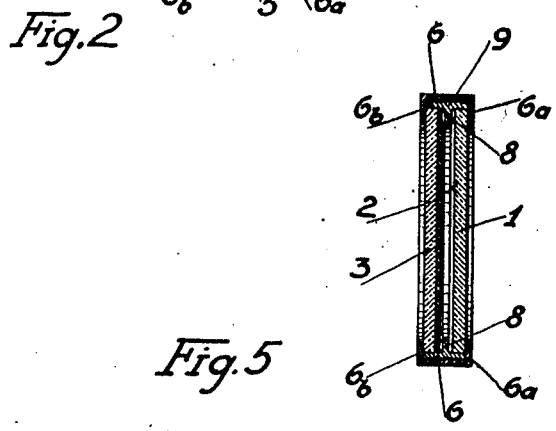

As mentioned above, the most perfect embodiment may be obtained by using an annular spacing member 8 as well as a clamping frame 6, as shown in Fig. 5. This figure shows also a special form of the annular piece 8, having a T-shaped cross section the part 9 of which affords an increased tightness against the incidental penetration of injurious gases.

Having thus described my invention, what I claim and desire to secure by Letters Patent is:

1. An eye protector against injurious rays, comprising a pair of glasses and supporting means peripherally engaging said glasses, one of said glasses being located forwardly of the other glass and having a light transparent metallic film supported thereon, the other glass being separated from such forwardly located glass by an insulating dead air space, said two glasses having their adjacent faces at the periphery thereof engaged by an annulus of insulating material.

2. An eye protector against injurious rays, comprising a pair of glasses and supporting means peripherally engaging said glasses, one of said glasses being located forwardly of the other glass and having a light transparent metallic film supported thereon, the other glass being separated from such forwardly located glass by an insulating dead air space, said two glasses having their adjacent faces at the periphery thereof engaged by an annulus of insulating material such as paper or the like.

3. An eye protector against injurious rays, comprising a pair of glasses and an insulating annulus, one of said glasses being located forwardly of the other glass and having a light transparent metallic film supported on its inner face, said annulus being seated against such inner face at its periphery, the other glass being seated on said annulus whereby an insulating air space is formed between the two glasses.

4. An eye protector against injurious rays, comprising a pair of glasses and an insulating annulus, one of said glasses being located forwardly of the other glass and having a light transparent metallic film supported on its inner face, said annulus being seated against such inner face at its periphery, the other glass being seated on said annulus whereby an insulating air space is formed between the two glasses, said other glass being colored.

5. An eye protector against injurious rays, comprising a pair of glasses and an insulating annulus, one of said glasses being located forwardly of the other glass and having a light transparent metallic film supported on its inner face, said annulus having a T-section and being formed of paper material and being seated against such inner face at its periphery, the other glass being seated on said annulus whereby an insulating air space is formed between the two glasses.

DEZSÖ DE BAYER-KRUCSAY.